(12) United States Patent
Caffy

(10) Patent No.: US 8,981,718 B2
(45) Date of Patent: Mar. 17, 2015

(54) SERIAL MULTI-VEHICLE QUICK CHARGE STATION

(75) Inventor: James B. Caffy, Morrison, TN (US)

(73) Assignee: Nissan North America, Inc., Franklin, TN (US)

( * ) Notice: Subject to any disclaimer, the term of this patent is extended or adjusted under 35 U.S.C. 154(b) by 385 days.

(21) Appl. No.: 13/481,224

(22) Filed: May 25, 2012

(65) Prior Publication Data

US 2013/0314037 A1    Nov. 28, 2013

(51) Int. Cl.
*H02J 7/00* (2006.01)
*B60L 11/18* (2006.01)

(52) U.S. Cl.
CPC ........... *H02J 7/0073* (2013.01); *B60L 11/1825* (2013.01); *H02J 7/0027* (2013.01)
USPC ........... 320/109; 320/103; 320/104; 320/111; 320/116; 320/124

(58) Field of Classification Search
CPC . Y02T 10/7005; Y02T 10/7088; Y02T 90/14; B60L 11/1861; H02J 7/0013; H02J 7/0054; H02J 7/0075
USPC .................. 320/103–104, 109, 111, 116, 124
See application file for complete search history.

(56) References Cited

U.S. PATENT DOCUMENTS

| | | | |
|---|---|---|---|
| 4,849,682 A * | 7/1989 | Bauer et al. .................... | 320/106 |
| 5,594,318 A | 1/1997 | Nor et al. | |
| 5,803,215 A | 9/1998 | Henze et al. | |
| 5,926,004 A | 7/1999 | Henze | |
| 7,256,516 B2 | 8/2007 | Buchanan et al. | |
| 8,013,570 B2 | 9/2011 | Baxter et al. | |
| 2004/0169489 A1 * | 9/2004 | Hobbs ........................... | 320/104 |
| 2011/0074350 A1 | 3/2011 | Kocher | |
| 2011/0145141 A1 | 6/2011 | Blain | |
| 2012/0326668 A1 * | 12/2012 | Ballatine et al. .............. | 320/109 |
| 2013/0057209 A1 * | 3/2013 | Nergaard et al. ............. | 320/109 |

FOREIGN PATENT DOCUMENTS

| | | |
|---|---|---|
| GB | 2460500 A | 12/2009 |
| WO | 2011104219 A2 | 9/2011 |
| WO | 2011134861 A1 | 11/2011 |
| WO | 2011151696 A2 | 12/2011 |

* cited by examiner

*Primary Examiner* — Nghia Doan
(74) *Attorney, Agent, or Firm* — Young, Basile, Hanlon & MacFarlane, P.C.

(57) ABSTRACT

Disclosed herein are embodiments of serial multi-vehicle quick charge systems and stations for battery propulsion vehicles and methods thereof. One charging system comprises a charging unit having a plurality of charging circuits configured to be individually switched. The plurality of charging stations is electrically connected to the charging unit through the plurality of charging circuits. A controller is programmed to initiate charging of a vehicle connected to the charging unit through one of the charging stations by signaling a corresponding one of the charging circuits to close, track order of connection of each vehicle connected to the charging unit and initiate charging of each subsequently connected vehicle one at a time based on the order of connection, such that an individual vehicle is charged until a predetermined fraction of battery charge capacity has been obtained before the controller initiates charging of a vehicle next in the order of connection.

15 Claims, 7 Drawing Sheets

SERIAL MULTI-VEHICLE QUICK CHARGE STATION

TECHNICAL FIELD

The embodiments herein relate in general to multi-vehicle quick charge stations and in particular to serial multi-vehicle quick charge stations.

BACKGROUND

An electric vehicle is one that is powered by stored electric energy originally obtained from an external power source, and uses one or more electric or traction motors for propulsion. Over the years, due in part to the environmental impact of tailpipe emissions from petroleum based vehicles and the cost of fuel, consumers have been opting for environmentally friendly electric or hybrid vehicles. Most electric vehicles are provided with storage units such as batteries and since batteries deplete their stored charge while being used, they are required to be re-charged at regular intervals.

There is a large variety of charging equipment available for re-charging electric vehicles. For example, an electric vehicle charging station is an element in an infrastructure that supplies electric energy for the recharging of electric vehicles and plug-in hybrid electric-gasoline vehicles. As electric vehicles become more prevalent, more owners of public and private parking structures will want to provide charging stations for customers to use while parked in such parking structures.

SUMMARY

Disclosed herein are embodiments of serial multi-vehicle quick charge systems and stations for battery propulsion vehicles. One charging system for battery propulsion vehicles as disclosed herein comprises a charging unit having a plurality of charging circuits configured to be individually switched. Each of a plurality of charging stations is electrically connected to the charging unit through a respective one of the plurality of charging circuits. A controller is programmed to initiate charging of a vehicle connected to the charging unit through one of the plurality of charging stations by signaling respective corresponding one of the plurality of charging circuits to close, track order of connection of each vehicle connected to the charging unit and initiate charging of each subsequently connected vehicle one at a time based on the order of connection, such that an individual vehicle is charged until a predetermined fraction of battery charge capacity has been obtained before the controller stops charging the individual vehicle and initiates charging of a vehicle next in the order of connection.

A system disclosed herein for charging a plurality of battery propulsion vehicles with one charging unit comprises a plurality of charging stations each of which is electrically connected to the one charging unit through a respective one of a plurality of charging circuits. The system further comprises a controller that is programmed to initiate charging of a vehicle connected to one of the plurality of charging stations by signaling a corresponding one of the plurality of charging circuits to close, track order of connection of each vehicle connected to the plurality of charging stations and initiate charging of each subsequently connected vehicle one at a time based on the order of connection, such that an individual vehicle is charged until a predetermined fraction of battery charge capacity has been obtained before the controller stops charging the individual vehicle and initiates charging of a vehicle next in the order of connection.

Also disclosed herein are methods of serially charging a plurality of battery propulsion vehicles with one charging unit. One such method comprises initiating charging of a vehicle connected to the charging unit through one of a plurality of charging stations, tracking an order of connection of vehicles connected to the charging unit, charging the vehicle until a predetermined fraction of battery charge capacity is reached and initiating charging of subsequently connected vehicles one at a time in the order of connection, with charging of respective ones of the subsequently connected vehicles concluding when the predetermined fraction of battery charge capacity is reached.

BRIEF DESCRIPTION OF THE DRAWINGS

The various features, advantages and other uses of the embodiments will become more apparent by referring to the following detailed description and drawings in which.

DETAILED DESCRIPTION

Figure 1:
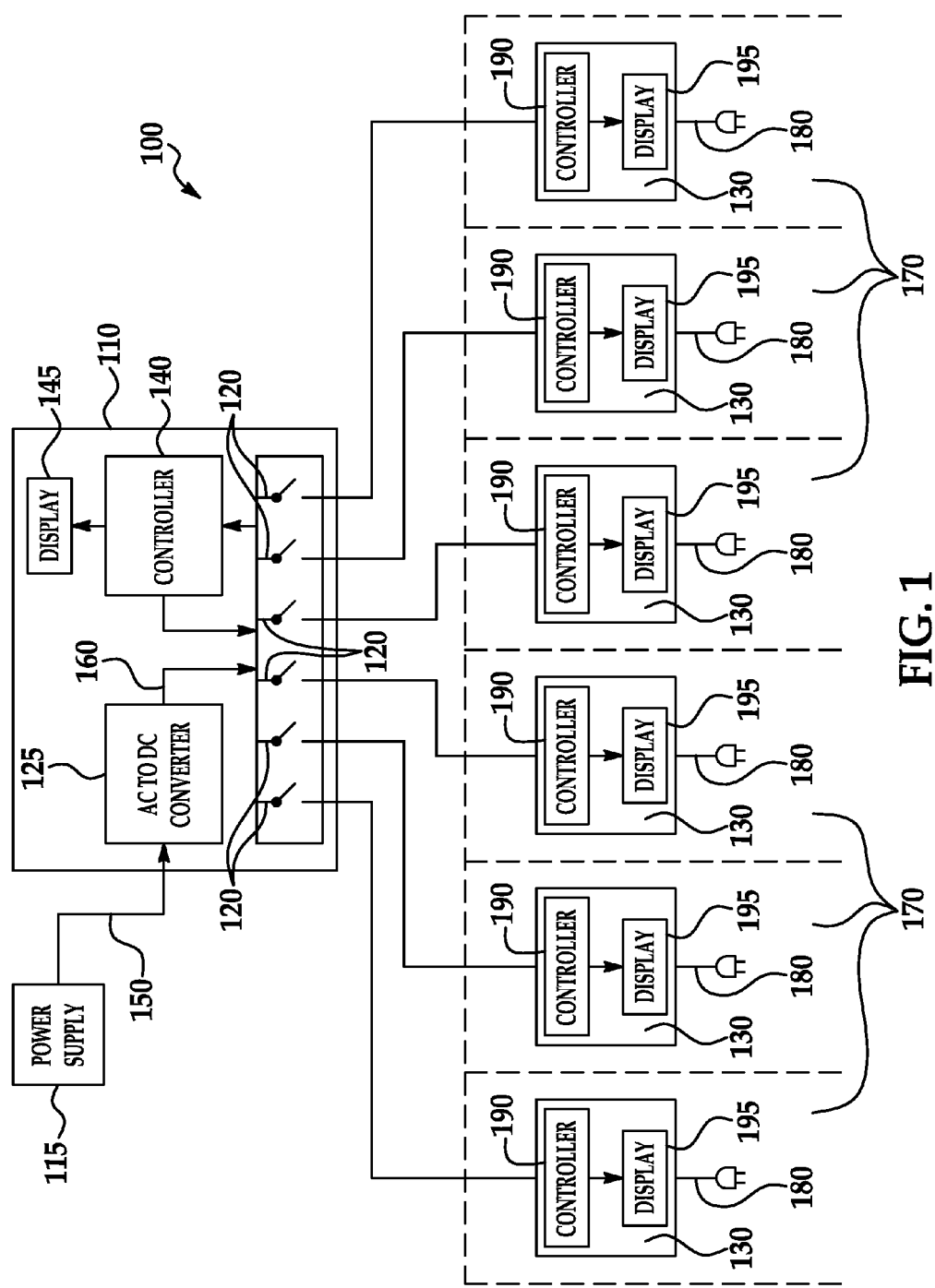
FIG. 1 is a schematic of a serial multi-vehicle quick charge system as disclosed herein.

There are different levels of charging units used by charging systems to charge electric vehicles. As used herein, the terms "electric vehicle" and "vehicle" include any vehicle that requires electrical charging, whether the vehicle is all electric or a hybrid, and includes any electric or hybrid operated transportation device.

A Level I charging arrangement typically employs a cord and plug connection and is rated at 120 VAC, being compatible with most commonly available grounded electrical outlets. A Level I charging connector can be transported in the vehicle with which it is used, and any required AC-to-DC converter circuitry typically resides onboard the vehicle. Level I charging arrangements are typically used in a home setting due to the length of time (e.g., 10-24 hours) required to fully charge a propulsion battery.

A Level II charging unit typically employs a permanently wired electrical supply and charging connector and is thus located at a fixed location. Level II charging units are typically rated for less than or equal to 240 VAC, and as with Level I charging units any required AC-to-DC converter circuitry typically resides onboard the vehicle. Level II charging units are often used in the home and in publicly accessible locations, even though the length of time (e.g., 4-8 hours) required for a battery charge capacity is still considerable.

A Level III charging unit also typically employs a permanently wired electrical supply and charging connector. Each Level III charging unit has an AC charging source that receives current from the power or utility grid. Unlike Level I and Level II charging units, Level III charging units typically include any required AC-to-DC converter circuitry needed to charge a propulsion battery due to cost and weight constraints. Level III charging units are typically rated to output 400-500 VDC. While it is conceivable for Level III charging units to be used in a home setting, they are typically only used in public settings due to the high expense and because residential structures are not typically supplied with current from electric utilities at such a high voltage. In essence, Level III chargers can significantly reduce charging times (e.g., 30-60 minutes for a battery charge capacity).

Electric vehicle charging stations utilizing charging units as described above are being located in public and private parking areas, municipalities, governments, city streets and interstates, as non-limiting examples. As vehicles requiring charging become more prevalent, vehicle owners will need to be able to re-charge their vehicles virtually anywhere. Charging units supporting multiple vehicles simply duplicate a single charger configuration. The more vehicles supported, the larger the charging unit and the larger the required AC electrical feed to the charging unit. The operators of the public and private parking areas, municipalities, governments, city streets and interstates, etc. desire vehicle charging stations that are capable of charging the largest number of vehicles in the least amount of time while being economically efficient.

The embodiments disclosed herein provide serial charging of multiple vehicles in timely succession while allowing the multiple vehicles to each occupy a parking space. The embodiments herein are contemplated for use with both Level II and Level III charging units, with the charging time limited in part by the voltage rating of the unit.

A serial multi-vehicle quick charge station is illustrated in FIG. 1. The charging system 100 has a charging unit 110 having a plurality of charging circuits 120 configured to be individually switched. The charging unit 110 receives current from a power source 115 connected to the power grid. Current from the power source 115 can be converted in the charging unit 110 by an AC to DC converter 125. A plurality of charging stations 130 are each electronically connected to the charging unit 110 through respective charging circuits 120. The charging unit 110 also includes a controller 140 and can further include a display 145.

Figure 2:
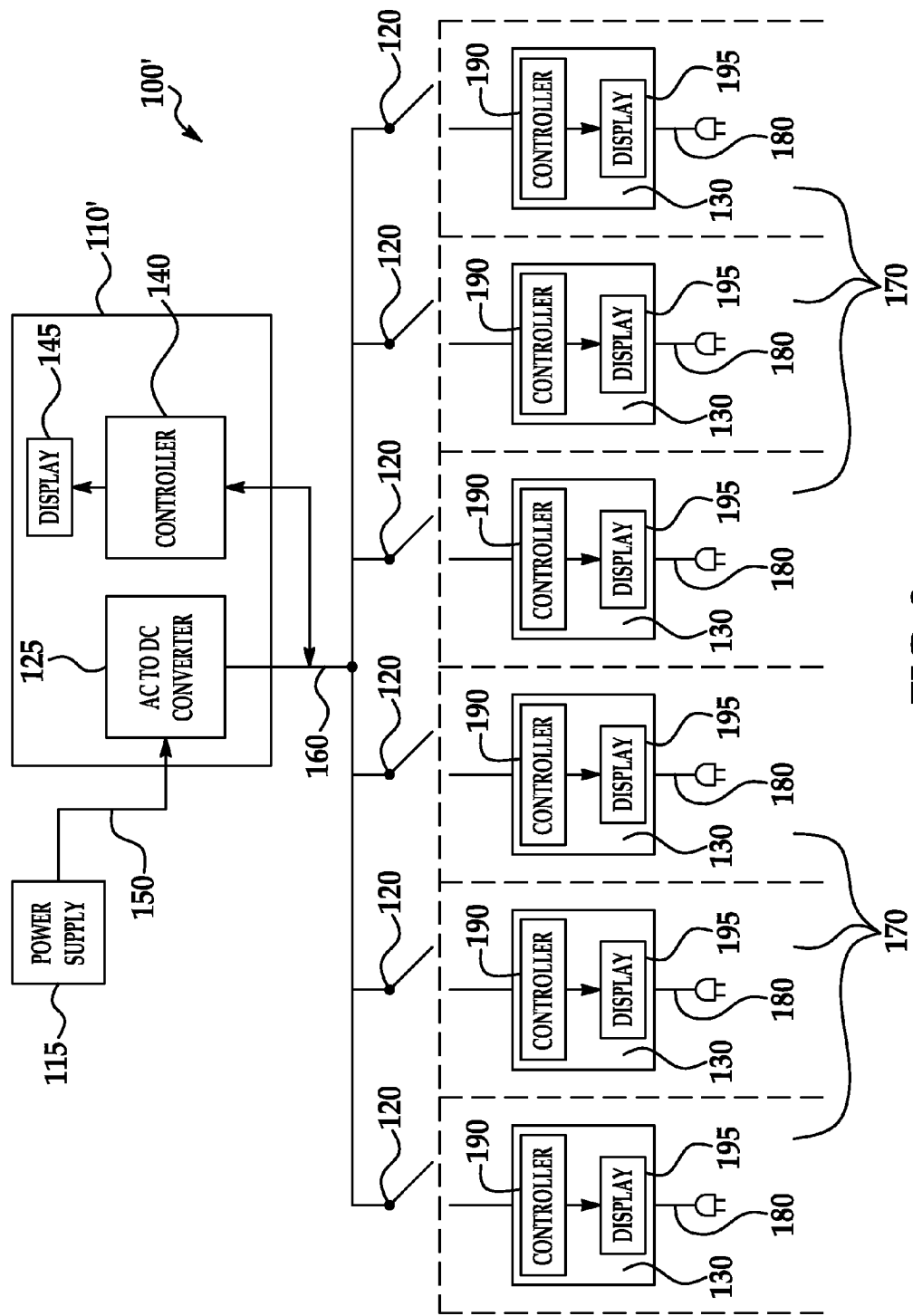
FIG. 2 is a schematic of another embodiment of a serial multi-vehicle quick charge system as disclosed herein.

Alternative to the charging system 100 of FIG. 1, FIG. 2 illustrates a system 100' that can be created by retrofitting an existing charging unit 110'. The charging unit 110' receives current from the power source 115 connected to the power grid. Current from the power source 115 can be converted in the charging unit 110 by the AC to DC converter 125 as in FIG. 1. The system 100' is connected to the outlet of the AC to DC converter 125 and comprises a plurality of charging stations 130 each electronically connected to the charging unit 110' through a respective charging circuit 120. The system 100' also includes a controller 140 that can be incorporated into the charging unit 110'. Alternatively, the programming of the controller 140 can be incorporated into an existing controller in the charging unit 110'.

Each of the charging units 110, 110' in FIGS. 1 and 2 includes the AC to DC converter 125 for illustration. The charging systems 100, 100' will not require an AC to DC converter 125 if the charging unit 110, 110' is configured to supply AC power directly to the vehicles, such as with a Level II charging unit.

The number of charging circuits 120 and respective charging stations 130 shown in the figures is provided for illustration only and is not meant to be limiting. Any number of charging circuits 120 and respective charging stations 130 are contemplated within the purview of the embodiments.

The embodiments will now be discussed in more detail with reference to the system 100 shown in FIG. 1 for convenience, with the understanding that system 100' in FIG. 2 can comprise any of the elements disclosed herein.

The AC electrical supply 150 from the power source 115 need only be sized and configured to support a single charging unit 110 and charging station 130 at any given time. The AC electrical supply 150 feeds current to the AC to DC converter 25. As a non-limiting example, 480 VAC can be converted to 360 VDC in the AC to DC converter 125. The converted DC electrical supply 160 feeds DC power to the charging circuit 120 in use at the particular time. As shown in FIG. 1, each charging circuit 120 is in the open position, preventing DC power from flowing through DC electrical supply 160 to any of the charging stations 130 as no vehicles are connected for charging.

Each charging station 130 is associated with a respective vehicle parking space 170. When a vehicle is in need of charging and parks in a parking space 170, the vehicle will be connected to the charging station 130 through a charging connector 180. Each charging station 130 can include a controller 190 that communicates with the controller 140 of the charging unit 110, sending data for use by controller 140 and/or receiving data from controller 140. Each charging station 130 can also include a display 195.

The controllers 140, 190 can be separate conventional central processing units, or each controller 140, 190 can be incorporated into a single conventional central processing unit. Alternatively, the controllers 140, 190 can be any other type of device, or multiple devices, capable of manipulating or processing information now-existing or hereafter developed. For example, the memory in the controllers 140, 190 can be a random access memory (RAM) device. However, any other suitable type of storage device can be used as the memory. The controllers 140, 190 can include code, data, operating systems and application programs to perform the methods described here.

Each of the displays 145, 195 can be a touch sensitive display that combines a display with a touch sensitive element that is operable to sense touch inputs. Other output devices that permit a user to program or otherwise use the charging stations 130 can be provided in addition to or as an alternative to the displays 195. The display can be implemented in various ways, including by a liquid crystal display (LCD) or a cathode-ray tube (CRT) or light emitting diode (LED) display, such as an OLED display.

Figure 3:
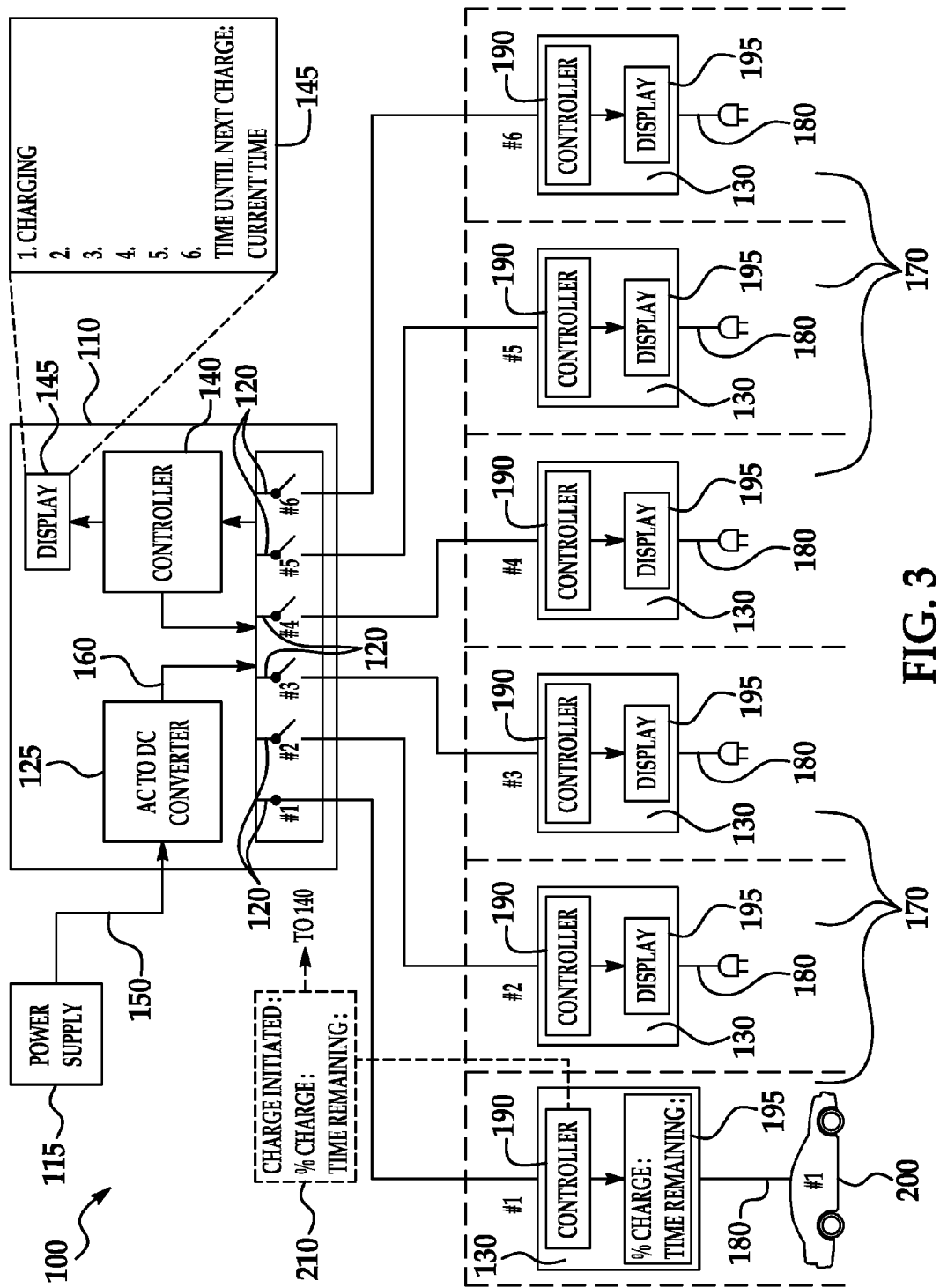
FIG. 3 is a schematic of a serial multi-vehicle quick charge system as disclosed herein charging a single vehicle.

Controller 140 can be programmed to initiate charging of a vehicle 200 connected to one of the plurality of charging stations 130 via the respective charging circuit 120. It should be understood that the controller 140 can further communicate with the charging stations 130 (e.g., to send/receive advertising, billing, or other data) via any wired or wireless connections that are separate from the charging circuits 120 so that such connections are not interrupted by opening/closing of the individual charging circuits 120. FIG. 3 illustrates a single vehicle #1 connected to charging station #1 through the charging connection 180. As no other vehicle 200 is currently being charged, vehicle #1 will be charged as soon as the required criteria are met, if any. For example, a charging station 130 may request identity verification and/or means of payment, such as swiping a credit card, before charging is initiated. Each charging station 130 can include means for making payment, such as a credit card reader. Alternatively, only the charging unit 110 may have means for making payment for each charging station 130. Another example of required criteria can include notification of proper connection between the vehicle 200 and the charging station 130.

When the criteria is met, the controller 190 of charging station #1 can communicate this to controller 140, which in turn will signal to close charging circuit #1 using means such as solid state relays or programmable logic controllers so that DC power will flow through the charging circuit #1 to charging station #1 to charge vehicle #1. If no other vehicle 200 arrives during charging of vehicle #1, the charging of vehicle #1 will continue until charging is complete or the user of vehicle #1 disconnects the vehicle. If either occurs, charging circuit #1 will be signaled to open, stopping the flow of DC power through charging circuit #1.

The display 195 at charging station #1 can display any information as desired or required within the purview of the disclosure. As a non-limiting example, display 195 may indicate any combination of the following: whether payment has been made, amount spent, time that charging was initiated, time being charged, time remaining to reach a predetermined charge, time remaining to reach battery charge capacity and current percent charged. The display 195 of charging station #1 in FIG. 3 provides percent charge and time remaining as a non-limiting example. The displays 195 of the remaining charging stations 130 can remain blank or can display any information as desired or required within the purview of the disclosure. As a non-limiting example, displays 195 may indicate the time remaining until charging of a subsequent vehicle could be initiated.

The controller 190 of each charging station 130 can provide information to controller 140 of the charging unit 110 during charging of a respective vehicle 200. FIG. 3 illustrates the controller 190 of charging station #1 sending data 210 to controller 140 including time charge was initiated, percent of charge and time remaining for charging as a non-limiting example.

The display 145 at the charging unit 110 can display any information as desired or required within the purview of the disclosure. As a non-limiting example, display 145 may indicate any combination of the following: identity of charging station currently charging; time charging initiated, time remaining to reach a predetermined charge, time remaining to reach battery charge capacity, current percent charged and time remaining until charging of next vehicle can be initiated. FIG. 3 illustrates display 145 providing the number of the charging station currently charging, the time until the next charge will be available and the current time as a non-limiting example.

Figure 4:
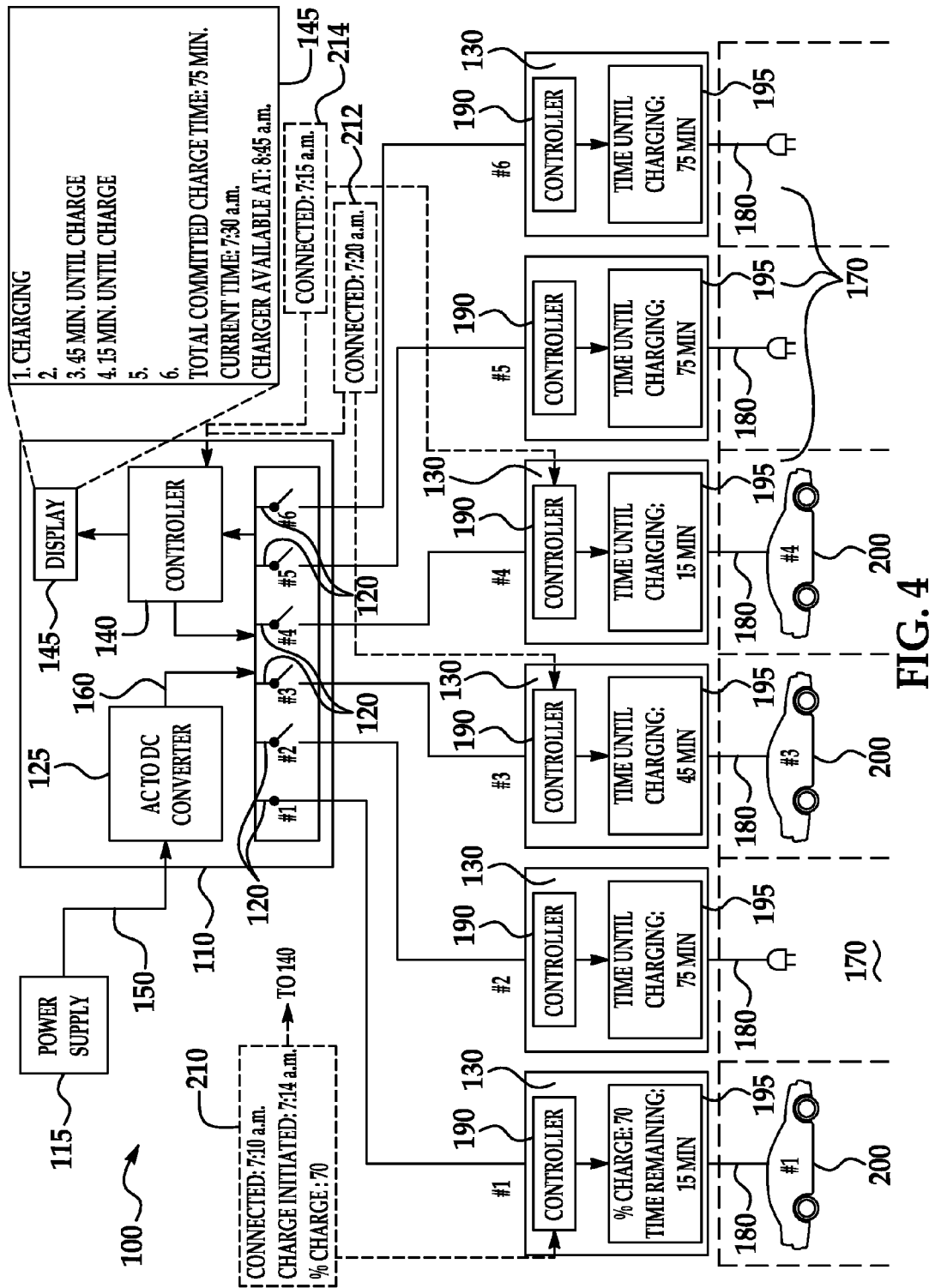
FIG. 4 is an exemplary schematic of a serial multi-vehicle quick charge system in use.

Controller 140 can be programmed to track the order of connection of each subsequent vehicle 200 connected to respective charging stations 130 during the charging of any vehicle 200. Controller 140 can track the order of connection, as a non-limiting example, by receiving a connection time from each charging station controller 190 to which a vehicle 200 is connected. FIG. 4 illustrates three vehicles 200 connected to system 100 as a non-limiting example. The controller 140 tracks the order that the three vehicles 200 arrive, with vehicle #1 arriving first at 7:10 am, vehicle #4 arriving second at 7:15 am and vehicle #3 arriving third at 7:20 am.

Controller 140 is programmed to initiate charging of each subsequent vehicle 200 one at a time based on the order of connection, such that an individual vehicle 200 is charged until a predetermined fraction of battery charge capacity has been obtained before a subsequent vehicle 200 is charged. Using the example in FIG. 4, the controller 140 would discontinue charging vehicle #1 when vehicle #1 has reached the predetermined fraction of battery charge capacity. The controller 140 would then initiate charging of vehicle #4 by closing the associated charging circuit 120 to allow DC power to flow through circuit. When vehicle #4 reaches the predetermined fraction of battery charge capacity, the controller 140 would discontinue charging vehicle #4 and would initiate charging of vehicle #3.

The length of time of charge is dependent upon various factors, including the amount of charge the battery has when it is connected. For example, a vehicle connecting with a battery at 5% charge will take longer to reach a desired charge than a vehicle connecting with a battery at 40% charge will take to reach the same desired charge. FIG. 4 assumes a charge time of thirty minutes simply for illustrative purposes. If there is 15 minutes remaining to charge vehicle #1 to the predetermined fraction of battery charge capacity, then the charging of vehicle #4 will be initiated in fifteen minutes. If it takes thirty minutes to charge vehicle #4, the charging of vehicle #3 will be initiated in forty-five minutes. The next vehicle 200 to be connected to one of the open charging stations 130 will have charge initiated in seventy-five minutes. These numbers are not static and can be updated continuously or on an interval basis, such as every minute.

It should be noted that a vehicle 200 that is being charged may be removed from the charging station 130 by its owner prior to the charge reaching the predetermined fraction of battery charge capacity. If this occurs, the controller is configured to move to the next vehicle 200 in the order and to recalculate the time until charge for each remaining vehicle 200.

As illustrated in FIG. 4, display 190 of charging station #1 provides the percent charge and the time remaining until charge is completed. The displays 190 of charging stations #3 and #4 can provide the time until charging for the respective vehicle will be initiated. The remaining displays 190 can be blank or can display data such as the time until charging would begin if a vehicle 200 were to be connected at that station.

The controllers 190 of the charging stations 130 can communicate data with one another, or the controllers can communicate data only with controller 140 to provide and receive data. As illustrated in FIG. 4, controller 190 of charging station #1 can send to controller 140 data 210 including the time connected, the time charging was initiated and the status of the charge. Controllers 190 of charging stations #3 and #4 each can send to controller 140 data 212, 214 including the time the associated vehicle was connected. Display 145 of the charging unit 110 is illustrated in FIG. 4 as providing the status of each charging station 130 to which a vehicle 200 is connected, the total charge time remaining based on the vehicles currently connected, as well as the current time and the time charging will be available.

The systems 100, 100' disclosed herein can initially charge vehicles 200 to the aforementioned predetermined fraction of battery charge capacity. This predetermined fraction of battery charge capacity can be approximately between 75% and 85% of battery charge capacity, and more particularly about 80% of battery charge capacity. In this scenario, charging is initially limited to the predetermined fraction of battery charge capacity as this predetermined percentage is an efficiency threshold, where further charging beyond the predetermined percentage requires increasing amounts of time for decreasing increments of charge. Limiting charging to this predetermined percentage optimizes efficiency of the systems 100, 100' and increases the amount of vehicles that can be charged in the least amount of time.

The controller 140 can be further programmed to subsequently charge vehicles 200 remaining connected to the charging unit 110 to battery charge capacity after a last connected vehicle is charged to the predetermined fraction of battery charge capacity. For example, the remaining vehicles 200 can be charged to battery charge capacity in the order of connection. If a vehicle 200 is connected to an available charging station 130 while the charging unit is "topping off" a vehicle, i.e. charging more than the predetermined fraction of battery charge capacity, the controller 140 can open the charging circuit 120 associated with the charging station 130 topping off the vehicle 200 to stop the flow of power and can initiate charging of the newly connected vehicle 200. In essence, the system 100 is configured to prioritize charging of connected vehicles 200 in succession only to the predetermined fraction of battery charge capacity unless all connected vehicles 200 have reached the predetermined battery charge capacity.

Figure 5:
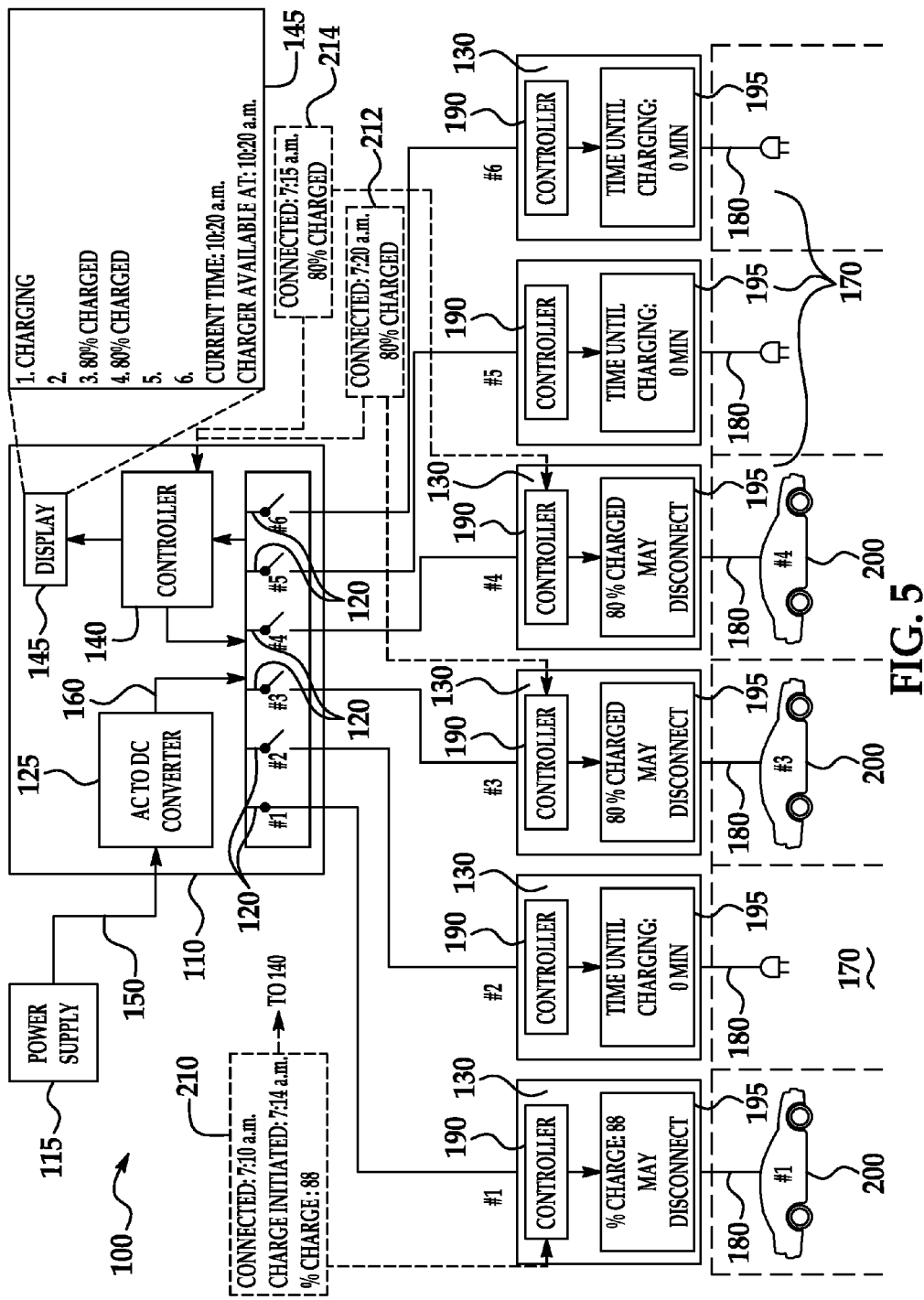
FIG. 5 is another exemplary schematic of a serial multi-vehicle quick charge system in use.

FIG. 5 illustrates the system 100 shown in FIG. 4 with each of vehicles #1, #3 and #4 charged to the predetermined fraction of battery charge capacity. The vehicles remain in the parking spaces 170 because, for example, the vehicle's driver has not yet left the facility that the parking lot serves. Because each of the connected vehicles has been charged to the predetermined percentage of full, the controller 140 begins to top off the vehicles based on order of connection.

As illustrated in FIG. 5, display 190 of charging station #1 provides the percent charge, listed as 88 percent for example, and indicates that the vehicle #1 can be disconnected if desired. The displays 190 of charging stations #3 and #4 can provide the amount of charge and that charge is complete, i.e. the vehicle can be disconnected if desired. The remaining displays 190 can be blank or can display data such at the time until charging would begin if a vehicle 200 were to be connected at that station. Because the currently connected vehicles 200 have all been charged to the predetermined fraction of battery charge capacity, the time until charging is available is shown as zero. A vehicle 200 connected to any one of charging stations #2, #5 or #6 would have immediate charging priority as soon as any required criteria has been met.

The controllers 190 of the charging stations 130 can communicate data with one another, or the controllers can communicate data only with controller 140 to provide and receive data. As illustrated in FIG. 5, controller 190 of charging station #1 can send to controller 140 data 210 including the time connected, the time charging was initiated and the status of the charge. Controllers 190 of charging stations #3 and #4 each can send to controller 140 data 212, 214 including the time the associated vehicle was connected and the percentage charge or that initial charging is complete. Display 145 of the charging unit 110 is illustrated in FIG. 5 as providing the status of each charging station 130 to which a vehicle 200 is connected, as well as the current time and the time at which charging will be available.

Figure 6:
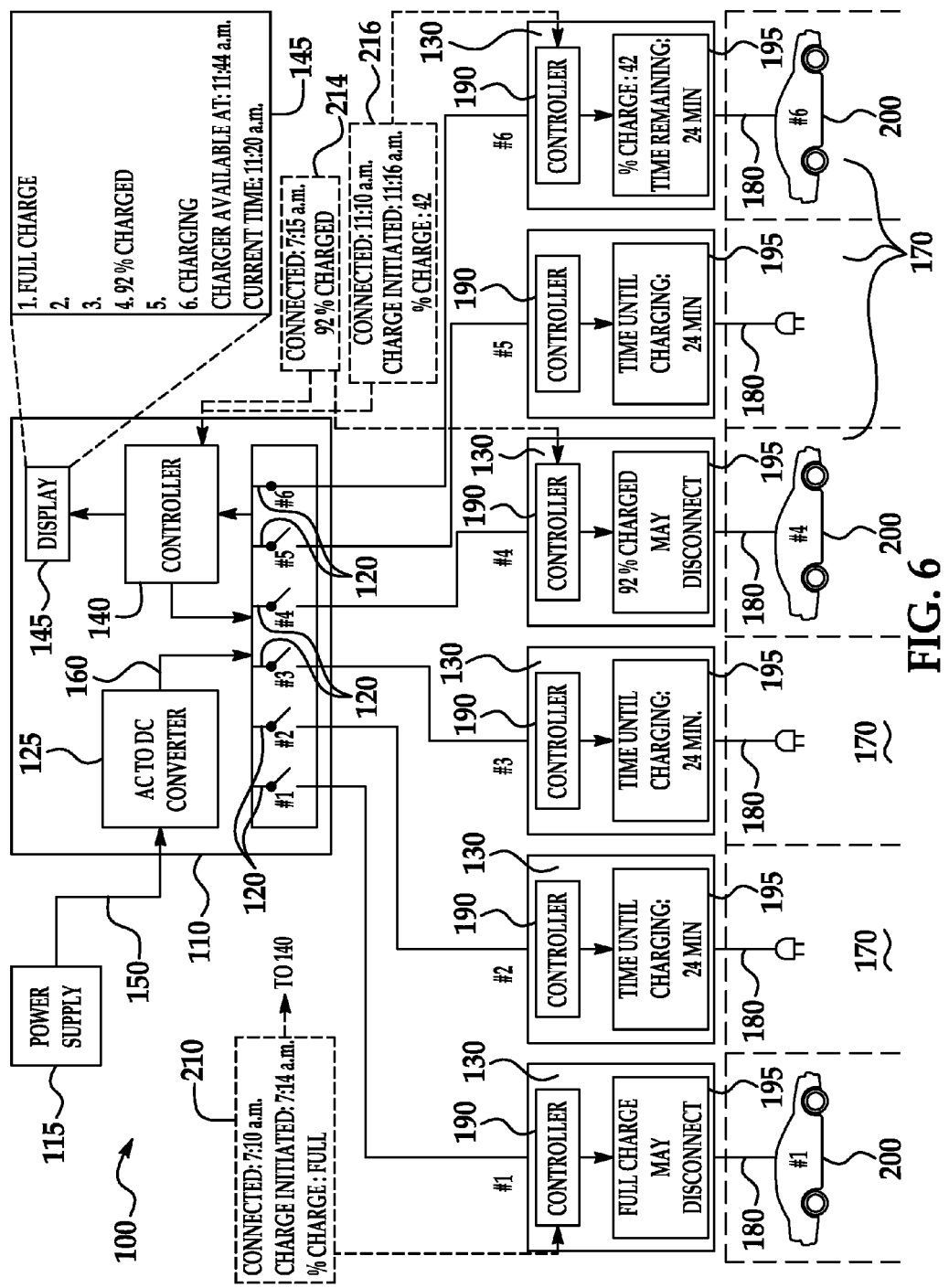
FIG. 6 is yet another exemplary schematic of a serial multi-vehicle quick charge system in use.

As illustrated in FIG. 6, vehicle #1 is now fully charged but yet remains in the parking space 170. Vehicle #3 has left the parking space 170. Vehicle #4 was being topped off, and was charged to 92 percent when vehicle #6 connected to charging station #6. Because vehicle #4 was already charged to the predetermined fraction of battery charge capacity, and was being topped off, controller 140 opens charging circuit #4 and closes charging circuit #6 after any required criteria is met for vehicle #6 to initiate charging of vehicle #6.

As illustrated in FIG. 6, display 190 of charging station #1 can indicate that vehicle #1 is fully charged, and can indicate that vehicle #1 can be disconnected if desired. The display 190 of charging station #4 can provide the amount of charge and that charge is complete (i.e., that the vehicle can be disconnected if desired). The display 190 of charging station #6 can provide the amount of charge and the time remaining until the predetermined fraction of battery charge capacity is achieved. The remaining displays 190 can be blank or can display data such at the time until charging would begin if a vehicle 200 were to be connected at that station. Because vehicle #6 has 24 minutes remaining and the other connected vehicles 200 have all been charged to the predetermined fraction of battery charge capacity, the time until charging is available is shown as 24 minutes.

The controllers 190 of the charging stations 130 can communicate data with one another, or the controllers can communicate data only with controller 140 to provide and receive data. As illustrated in FIG. 6, controller 190 of charging station #1 can send to controller 140 data 210 including the time connected, the time charging was initiated and the status of the charge. Controller 190 of charging station #3 is not currently sending or receiving as no vehicle is connected to charging station #3. Controllers 190 of charging stations #4 and #6 each can send to controller 140 data 214, 216 including the time the associated vehicle was connected and the percentage charge or that initial charging is complete. Display 145 of the charging unit 110 is illustrated in FIG. 6 as providing the status of each charging station 130 to which a vehicle 200 is connected, as well at the current time and the amount of time in which charging will be available.

Figure 7:
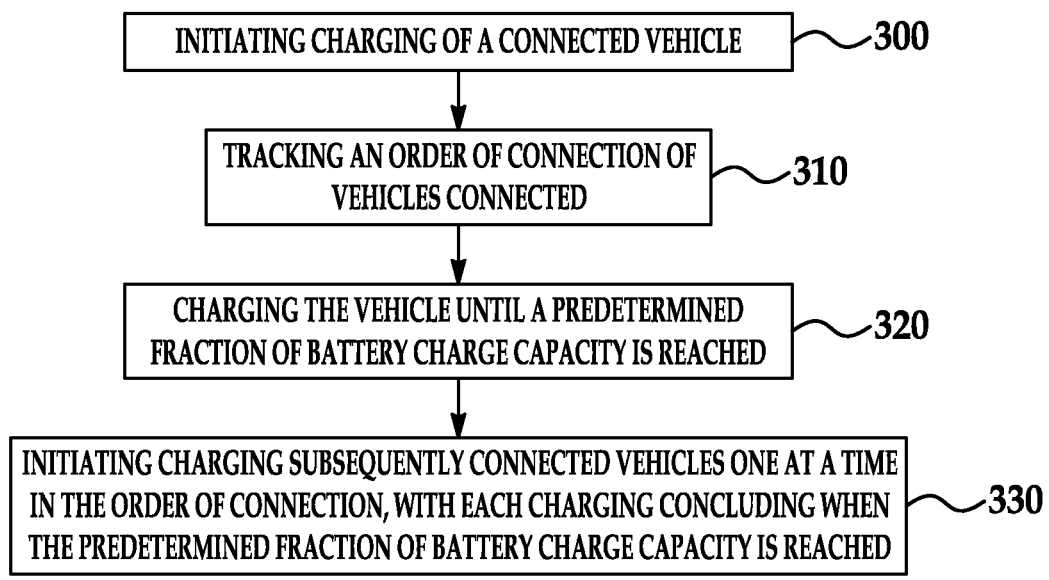
FIG. 7 is a flow diagram of a method of charging a vehicle with a serial multi-vehicle quick charge system as disclosed herein.

Also disclosed herein are methods of charging a plurality of electric vehicles in serial (i.e., in succession) with one charging unit. FIG. 7 is a flow diagram of one method disclosed herein. In step 300, charging of a vehicle 200 connected to the charging unit 130 through one of a plurality of charging stations 130 is initiated by signaling controller 140 to close the respective charging circuit 120 so that power can flow through the charging circuit 120 to the corresponding charging station 130.

In step 310, an order of connection of subsequent vehicles 200 connected to the charging unit 110 while the charging unit 110 is charging is tracked by the controller 140. If vehicle #1 is being charged, it is the only vehicle connected, and no other vehicles connect to the charging unit 110 during the charging of vehicle #1, then no order will be available to track and step 310 will be completed. In step 320, charging of the vehicle occurs until a predetermined fraction of battery charge capacity is reached. When a subsequent vehicle 200 connects to the charging unit 110, charging of that subsequent vehicle 200 will be initiated. If more than one subsequent vehicle 200 connects, charging of the subsequent vehicles 200 will be initiated in step 330 one at a time in the order of connection, with each charging operation concluding when the predetermined fraction of battery charge capacity is reached.

If four vehicles 200, for example vehicles #2-#5, connect to the charging unit 110 while vehicle #1 is charging, the controller 140 will note the order that those four vehicles 200 connected in step 310. The charging of vehicle #1 will continue until a predetermined fraction of battery charge capacity has been reached in step 320, at which time the controller 140 will determine the next vehicle 200 in the order of connection, say vehicle #2, and initiate charging of vehicle #2 in step 330. When vehicle #2 is charged to the predetermined fraction of battery charge capacity, the next vehicle 200 in the order of connection, say vehicle #3, will be charged. If two more vehicles 200, vehicles #6 and #7, connect while vehicle #3 is charging, the controller 140 will add those vehicles 200 to the order of connection.

The method can include determining a total charge time based on a number of vehicles connected to the charging unit and a status of charge of each vehicle and displaying the total charge time. Additionally or alternatively, the identity of the charging station that is currently charging can be displayed.

Also, an amount of time remaining until a particular connected vehicle will begin to charge can be determined and displayed.

The method can also include determining a clock time at which charging of a particular connected vehicle will occur based on the amount of time remaining until vehicles having a higher priority are charged, with the time at which charging will occur being displayed. An amount of charge of the charging station currently charging can be monitored, with the amount of charge being displayed during charging.

The methods herein can further comprise charging to battery charge capacity vehicles 200 remaining connected to the charging unit 110 after a last connected vehicle 200 is charged to the predetermined fraction of battery charge capacity, the remaining vehicles being charged to battery charge capacity in the order of connection as determined by the controller 140.

The serial multi-vehicle quick charge systems disclosed herein can be especially suited for parking areas where immediate charging is desired if available but may not be an absolute necessity. As a non-limiting example, a serial multi-vehicle quick charge system can be used in a parking area of a theater, mall, sports arena, restaurant or office building, where patrons park and typically leave their vehicles for one or more hours. As another non-limiting example, a serial multi-vehicle quick charge system can be used in a parking area of a hotel, where patrons park and typically leave their vehicles overnight. A hotel may provide a system with a larger number of charging units as the vehicles are typically parked longer and a single charging unit will have more time to cycle through the vehicles.

The serial multi-vehicle quick charge systems disclosed herein can be incorporated into existing charger designs and technology. The systems allow for continued use of a charging unit when the vehicles remain parked after being charged. The footprint of such a system is reduced as only one charging unit is required to charge a plurality of vehicles. This reduces the cost per parking space, improving the return on investment for the provider of the charging system.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A charging system for battery propulsion vehicles comprising:
   a charging unit having a plurality of charging circuits configured to be individually switched;
   a plurality of charging stations each of which is electrically connected to the charging unit through a respective one of the plurality of charging circuits;
   a controller programmed to:
      initiate charging of a vehicle connected to the charging unit through one of the plurality of charging stations by signaling a corresponding one of the plurality of the charging circuits to close;
      track order of connection of each vehicle connected to the charging unit;
      initiate charging of each subsequently connected vehicle one at a time based on the order of connection, such that an individual vehicle is charged until a predetermined fraction of battery charge capacity has been obtained before the controller stops charging the individual vehicle and initiates charging of a vehicle next in the order of connection; and
      charge to battery charge capacity vehicles remaining connected to the charging unit after a last connected vehicle is charged to the predetermined fraction of battery charge capacity, the remaining vehicles being charged in succession to battery charge capacity in the order of connection.

2. The charging system of claim 1, wherein the predetermined fraction of battery charge capacity is between 75% and 85% of battery charge capacity.

3. The charging system of claim 1 further comprising a central display unit configured to identify one of the plurality of charging stations that is currently charging.

4. The charging system of claim 1, wherein each of the plurality of charging stations comprises a display unit and the controller is further programmed to monitor respective amounts of charge of vehicles connected to the plurality of charging stations, each of the display units being configured to display a corresponding one of the respective amounts of charge.

5. The charging system of claim 1, wherein the charging unit receives 400-500 volt DC power and delivers DC power to the plurality of charging stations.

6. The charging system of claim 1, wherein each of the plurality of charging stations comprises a controller configured to send and receive data to the controller of the charging unit.

7. The charging system of claim 1, wherein each of the plurality of charging stations includes a pay station, the controller further programmed to include a vehicle in the order of connection only after payment is made to an associated pay station.

8. The charging system of claim 1, wherein the controller is further programmed to:
   interrupt charging to battery charge capacity the vehicles remaining connected when a newly connected vehicle connects to one of the plurality of charging stations having a battery charge capacity below the predetermined fraction of battery charge capacity; and
   charge the newly connected vehicle to the predetermined fraction of battery charge capacity.

9. The charging system of claim 1 further comprising a display unit, wherein the controller is further programmed to:
   determine an amount of time required to charge all connected vehicles to the predetermined fraction of battery charge capacity; and
   display on the display unit a time of day charging is next available based on the amount of time required to charge all the connected vehicles.

10. A system for charging a plurality of battery propulsion vehicles with one charging unit, the system comprising:
    a plurality of charging stations each of which is electrically connected to the one charging unit through a respective one of a plurality of charging circuits; and
    a controller programmed to:
       initiate charging of a vehicle connected to one of the plurality of charging stations by signaling a corresponding one of the plurality of charging circuits to close;
       track order of connection of each vehicle connected to the plurality of charging stations;
       initiate charging of each subsequently connected vehicle one at a time based on the order of connection, such that an individual vehicle is charged until a predetermined fraction of battery charge capacity has been obtained before the controller stops charging the individual vehicle and initiates charging of a vehicle next in the order of connection;

charge to battery charge capacity vehicles remaining connected to the charging unit after a last connected vehicle is charged to the predetermined fraction of battery charge capacity, the remaining vehicles being charged in succession to battery charge capacity in the order of connection;

interrupt charging to battery charge capacity the vehicles remaining connected when a newly connected vehicle is detected at one of the plurality of charging stations having a battery charge capacity below the predetermined fraction of battery charge capacity; and charge the newly connected vehicle to the predetermined fraction of battery charge capacity.

11. A method of charging a plurality of battery propulsion vehicles with one charging unit comprising:

initiating charging of a vehicle connected to the charging unit through one of a plurality of charging stations;

tracking an order of connection of vehicles connected to the charging unit;

charging the vehicle until a predetermined fraction of battery charge capacity is reached;

initiating charging of subsequently connected vehicles one at a time in the order of connection, with charging of respective ones of the subsequently connected vehicles concluding when the predetermined fraction of battery charge capacity is reached; and charging to battery charge capacity vehicles remaining connected to the charging unit after a last connected vehicle is charged to the predetermined fraction of battery charge capacity, the remaining vehicles being charged in succession to battery charge capacity in the order of connection.

12. The method of claim 11, wherein the predetermined fraction of battery charge capacity is between 75% and 85% of battery charge capacity.

13. The method of claim 11 further comprising displaying an identity of one of the plurality of charging stations that is currently performing a charging operation.

14. The method of claim 11 further comprising:

monitoring an amount of charge of a vehicle connected to one of the plurality of charging stations; and displaying the amount of charge.

15. The method of claim 11, further comprising:

interrupting charging to battery charge capacity the vehicles remaining connected when a newly connected vehicle connects to one of the plurality of charging stations having a battery charge capacity below the predetermined fraction of battery charge capacity; and charging the newly connected vehicle to the predetermined fraction of battery charge capacity.

* * * * *